United States Patent [19]
Dragon

[11] 3,732,494
[45] May 8, 1973

[54] PICK-UP ADAPTOR FOR SENSING SPEED

[75] Inventor: James W. Dragon, Arlington Heights, Ill.

[73] Assignee: Motorola, Inc., Franklin Park, Ill.

[22] Filed: June 13, 1972

[21] Appl. No.: 262,215

Related U.S. Application Data

[63] Continuation of Ser. No. 63,095, Aug. 12, 1970, abandoned.

[52] U.S. Cl. .............................. 324/173, 324/34 GT
[51] Int. Cl. .................................................. G01p 3/48
[58] Field of Search .................... 324/161, 162, 173, 324/174, 34 P, 34 D, 34 GT, 61 P; 310/155, 168; 73/71.4, 229, 230, 231

[56] References Cited

UNITED STATES PATENTS

| | | | |
|---|---|---|---|
| 2,556,471 | 6/1951 | Elam | 324/174 |
| 3,115,032 | 12/1963 | Norther | 73/71.4 |

OTHER PUBLICATIONS

J. M. Rigotti, Adjustable Transducer, IBM Technical Disclosure Bulletin, 11(9), Feb. 1969, p. 1126.

*Primary Examiner*—Michael J. Lynch
*Attorney*—Mueller and Aichele

[57] ABSTRACT

A pick-up mounting adaptor is positioned through a support housing of an engine so that a pick-up probe can be precisely spaced from the teeth on the ring gear behind the housing to develop pulses usable to operate a tachometer to indicate engine speed. The precise spacing of the end of the pick-up probe from the teeth on the ring gear is obtained without seeing the respective relationships between the pick-up probe and the ring gear by providing calibrated threads on the mounting adaptor for the probe so that after abutment of the probe with the ring gear, it can be threadedly retracted from contact therewith a predetermined number of turns to provide the accurate spacing necessary.

6 Claims, 3 Drawing Figures

PATENTED MAY 8 1973
3,732,494
FIG. 1
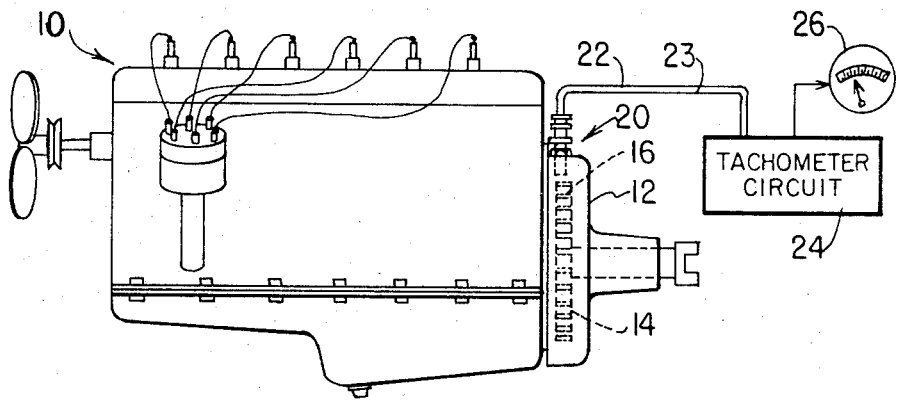
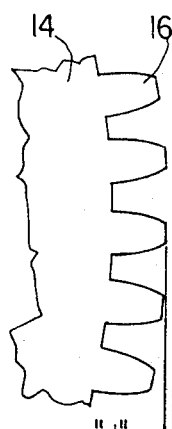
FIG. 2
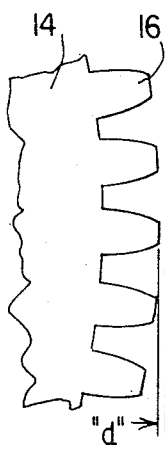
FIG. 3
INVENTOR
JAMES W. DRAGON
BY
Mueller & Aichele
ATTYS.

PICK-UP ADAPTOR FOR SENSING SPEED

This is a continuation, of application Ser. No. 63,095, filed Aug. 12, 1970 and now abandoned.

BACKGROUND OF THE INVENTION

This invention relates generally to a pick-up adaptor probe of the type for sensing speed of rotation of an object, and more particularly, relates to a pick-up adaptor for sensing the speed of rotation of an internal combustion engine by sensing the rate at which the teeth on the ring gear of the flywheel move past a pick-up probe, and a method method of spacing the pick-up probe from the flywheel.

Heretofore, tachometers that indicate engine rpm have taken various forms, such as electronic, mechanical or electro-mechanical devices, to give an indication to the operator of the exact or nearly exact engine rpm which is then being delivered by a particular engine. Some prior art tachometer devices operate from a pulse developed by the distributor so that upon each revolution of a four cycle engine only half the number of pulses as there are cylinders will be obtained. That is, two revolutions of the engine are required to produce the number of pulses corresponding to the number of cylinders. This, in most cases, is a sufficient number of pulses for accurate indication of high rpm's of an engine, but is generally insufficient for accurate indication of low rpm's of the engine.

Heavy equipment industrial engines, which operate at relatively low rpm's, are sometimes required to operate at fixed and known engine rpm's. Therefore, accurate sensing and indication of the low engine speed is required. This is best accomplished by sensing the speed of rotation of the teeth on the ring gear secured to the flywheel of the engine. This ring gear has many teeth and as such, will produce a substantial number of pulses for each rotation of the engine.

However, in attempting to sense the speed of rotation of the gear, problems are encountered in positioning the pick-up adaptor in proximity to the teeth on the ring gear accurately enough to obtain predictable and usable pulse signal information. Particularly, it is desired to position the pick-up adaptor in accurate spaced relation with respect to the teeth on the ring gear of the flywheel without actually seeing this spacing so that dismantling of engine components is unnecessary.

SUMMARY OF THE INVENTION

Accordingly, it is an object of this invention to provide a method for inserting a pick-up probe into an engine to sense the speed of rotation of a ring gear on a flywheel without actually seeing the end of the pick-up probe or the flywheel.

Another object of this invention is to provide an improved pick-up mounting adaptor which is efficient and reliable in operation and relatively simple and inexpensive to install.

Briefly, the pick-up mounting adaptor of this invention will receive a cylindrical probe having a sensing element positioned at one end of the probe to be located in close proximity with the teeth on the ring gear of a flywheel. The probe is preferably inserted through a sleeve which, in turn, is locked in position through a support wall, which may be the bell housing of the engine, so that the probe is readily slidably inserted through the sleeve to abut with the teeth on the ring gear. After the probe is fully inserted, a connector is positioned over the probe and threaded to one end of the sleeve. This is followed by a compression fitting which locks the connector securely about the probe so that any further rotation of the connector will also rotate the probe. The precise dimension of the space between the sensing end of the probe and the flywheel, i.e. teeth on the ring gear, is accomplished by threadily retracting the probe a precise distance corresponding to the pitch diameter of the threads on the sleeve and connector and the number of turns it is unscrewed. That is, a predetermined number of rotations, or fractional parts of rotation, of the connector will automatically retract the probe so that the end thereof is precisely spaced the desired distance from the teeth on the ring gear which is secured to the flywheel.

The electrical pulses produced by the probe, as a result of the metal formation of each gear tooth passing the probe, is applied to an electronic utilization circuit which, in turn, operates a meter calibrated to indicate engine rpm's.

BRIEF DESCRIPTION OF THE DRAWINGS

FIG. 1 is a diagrammatic representation of an internal combustion engine utilizing the pick-up adaptor of this invention;

FIG. 2 is an enlarged sectional view of the pick-up adaptor of this invention showing particular details of construction thereof; and FIG. 3 is an alternate arrangement of the pick-up adaptor of FIG. 2.

DETAILED DESCRIPTION OF THE PREFERRED EMBODIMENT

Referring now to FIG. 1, an internal combustion engine is designated by reference numeral 10 and is of any well-known type, preferably characterized as an industrial engine. The engine 10 has secured to the back end thereof a bell housing 12 which surrounds and confines a flywheel 14. The bell housing 12 may be of any general configuration, either a single piece unit or a split unit, or it may be formed of a portion made out of cast iron and/or another portion made of a stamped metal part. In the embodiment illustrated herein, the entire bell housing is of cast metal and surrounds the flywheel 14, but it is to be understood that this is not a limiting characteristic. A ring gear 16 is secured to the periphery of the flywheel 14 in the usual manner to become engaged with a starting gear actuated by a starting motor, not shown, to rotate the engine during its initial start-up operation. Once the engine 10 has started running, the starting gear disengages from the ring gear.

Most advantageously, a sensor pick-up adaptor unit 20 is mounted to the bell housing 12 by a method which provides positioning the end of a pick-up probe 42 a precise dimension from the teeth on the ring gear 16 without the need of seeing the end of the probe or the ring gear. The protuberances of the metal teeth forming the ring gear 16 will induce electrical signals into the pick-up probe 42, which may be an electro-magnetic device, each time a tooth passes the adaptor. This enables many pulses of signal information to be generated during each revolution of the engine 10.

The sensor pick-up probe 42 is connected to suitable circuit control means 24 via a pair of leads 22 and 23, thus eliminating any mechanical connection between the engine and a tachometer indicator 26. Thus, by providing a simple method of sensing the movement of the teeth on the ring gear 16, a sufficient number of electrical pulses can be generated to operate the indicator 26 and give an accurate rpm reading at relatively slow engine speeds.

Seen in FIG. 2 is an enlarged sectional view of the adaptor 20 inserted through the bell housing 12, only a portion of which is illustrated, to be positioned adjacent the ring gear 16. This arrangement provides a means by which the novel method of this invention can be carried out; that is, the dimensioning of the end of the sensor precisely from the teeth on the ring gear 16 without seeing these parts.

An aperture 30 is formed in the bell housing 12 at a location corresponding substantially to the peripheral region of the teeth on the ring gear 16. Through the aperture 30 is inserted a sleeve 32 having threaded portions 32a and 32b for receiving lock nuts 34 and 36, respectively. The sleeve 32 is locked in position on the housing 12 by lock nuts 34 and 36. A third lock nut 38 is threaded to the end 32b of the sleeve 32 to form a locking member with a connector 40 which is also threadedly secured to the sleeve at the threaded portion 32b. A pick-up sensing probe 32 is inserted through the sleeve 32 so that the pick-up end 42a thereof abuts with the flat surface portion 16a of the ring gear 16. At this time the pick-up probe 42 is securely locked to the connector 40 by means of a clamp ring 44 and a compression fitting 46. The compression fitting 46 and clamp ring 44 cooperate, one with the other, in a conventional manner securely to hold the probe 42 to the connector 40.

After the connector 40 and probe 42 are securely fastened together, the connector 40 is unscrewed from the threaded portion 32b threadedly to retract the end 42a of the probe 42 a precise distance 'd', as shown in FIG. 2, corresponding to the number of turns or fractional parts of turns of the connector 40 and the pitch diameter of the threads.

Once the end 42a of the probe 42 is precisely spaced from the ring gear 16, as indicated by the dimension 'd', the connector 40 is locked in position at the threaded end 32b of the sleeve 32 by the lock nut 38 and the dimension will remain as set by the method described.

FIG. 3 illustrates an alternate arrangement of the sensor pick-up adaptor of this invention which will allow the method of adjusting the dimension 'd' to be readily accomplished. Here, the sleeve is designated by reference numeral 50 and has a pipe thread 50a formed at the end thereof which engages a corresponding pipe thread 54 in a bell housing 52. This arrangement eliminates the need of the lock nut 34 at the inside of the bell housing, a condition which may not be easy to achieve. The arrangement of FIG. 3 supports a probe 58 to the sleeve 50 in the same manner as the probe 42 is supported to the sleeve 32.

Therefore, what has been described is a simple sensor pick-up adaptor arrangement which allows a convenient method of adjusting the spacing or dimension 'd' between the end of the pick-up and the ring gear, or other hidden part, without actually seeing the spacing being set. Variations and modifications of this invention may be incorporated without departing from the spirit and scope of the novel concepts disclosed and claimed herein.

I claim:

1. An adaptor for mounting a tachometer pickup in an aperture of an engine housing for sensing the movement of a device forming a part of the engine which is driven in proportion to engine RPM, the adaptor producing electrical pulses which are connected to the tachometer for indicating the rate of movement of the device, including in combination: an electromagnetic pickup for connection to the tachometer, an engine housing, a device forming a part of the engine which is driven in proportion to engine RPM, a sleeve mounted in the apertures of said housing, said pickup slidably mounted in said sleeve and being slid into contact with said device, connector means threadably secured to said sleeve, clamping means for securing said pickup to said connector means with said pickup being positioned in contact with said device, said connector means with said pickup connected thereto by said clamping means being threaded along said sleeve a predetermined amount thereby sliding said pickup therewithin out of contact with said device to precisely set the spacing between said pickup and the device.

2. The adaptor according to claim 1 wherein said device comprises a gear.

3. The adaptor according to claim 1 wherein said sleeve includes a pipe thread for mounting the same in the aperture of the engine housing.

4. The adaptor according to claim 1 including first and second nuts, said sleeve having first and second external spaced apart threaded portions on one end thereof and with said sleeve being inserted in said aperture, said first nut is secured to the first threaded portion on the end of said sleeve extending inside said housing and said second nut is secured to the second threaded portion spaced apart from said first threaded portion of said sleeve and extending outside said housing to thereby mount said sleeve in said housing.

5. The adaptor according to claim 4 including a locking nut threadably secured to said second threaded portion of said sleeve which extends outside said housing, said locking nut locking said connector means in position on said sleeve with said pickup being precisely set in position relative to the device.

6. The adaptor according to claim 5 wherein said clamping means comprises a clamp ring fitted to said pickup and a compression fitting having a threadable portion secured to said connector means for locking said pickup and connector together.

* * * * *